United States Patent [19]

Denbigh

[11] Patent Number: 5,473,838
[45] Date of Patent: Dec. 12, 1995

[54] CHRISTMAS TREE WATERING DEVICE

[76] Inventor: William R. Denbigh, 21 Stokes St., Freehold, N.J. 07728

[21] Appl. No.: 362,904

[22] Filed: Dec. 23, 1994

[51] Int. Cl.$^6$ ................................................ A47G 7/02
[52] U.S. Cl. .......................... 47/40.5; 47/48.5; 248/104; 248/312.1
[58] Field of Search ............................ 47/40.5, 48.5 G; 248/229, 312.1, 104; 24/510, 567, 561

[56] References Cited

U.S. PATENT DOCUMENTS

| | | | |
|---|---|---|---|
| 2,110,037 | 3/1938 | De Rosa | 248/104 |
| 2,258,076 | 10/1941 | Taylor et al. | 248/104 |
| 2,454,723 | 11/1948 | Stinne | 24/501 |
| 2,461,333 | 2/1949 | Maccaferri | 24/501 |
| 2,823,004 | 2/1958 | Melloh | 248/312.1 |
| 2,938,304 | 5/1960 | Thomas et al. | 47/40.5 |
| 3,311,270 | 3/1967 | Juergens | 47/48.5 G |
| 4,320,883 | 3/1982 | Bass | 248/104 |
| 4,850,137 | 7/1989 | Foster | 47/40.5 |
| 5,076,009 | 12/1991 | Cibor | 47/40.5 |
| 5,115,542 | 5/1992 | Gehres | 24/339 |
| 5,349,997 | 9/1994 | Rial | 47/40.5 |

*Primary Examiner*—Terry Lee Melius
*Assistant Examiner*—Joanne C. Downs

[57] ABSTRACT

A device for conveying irrigation water to a Christmas tree stand fluid bowl. The inventive device includes a funnel securable to a branch of the tree. A tubular conduit extends from the funnel along the tree trunk and terminates within the fluid bowl, thereby permitting fluid to be added to the fluid bowl without requiring an individual to directly access the fluid bowl.

7 Claims, 3 Drawing Sheets

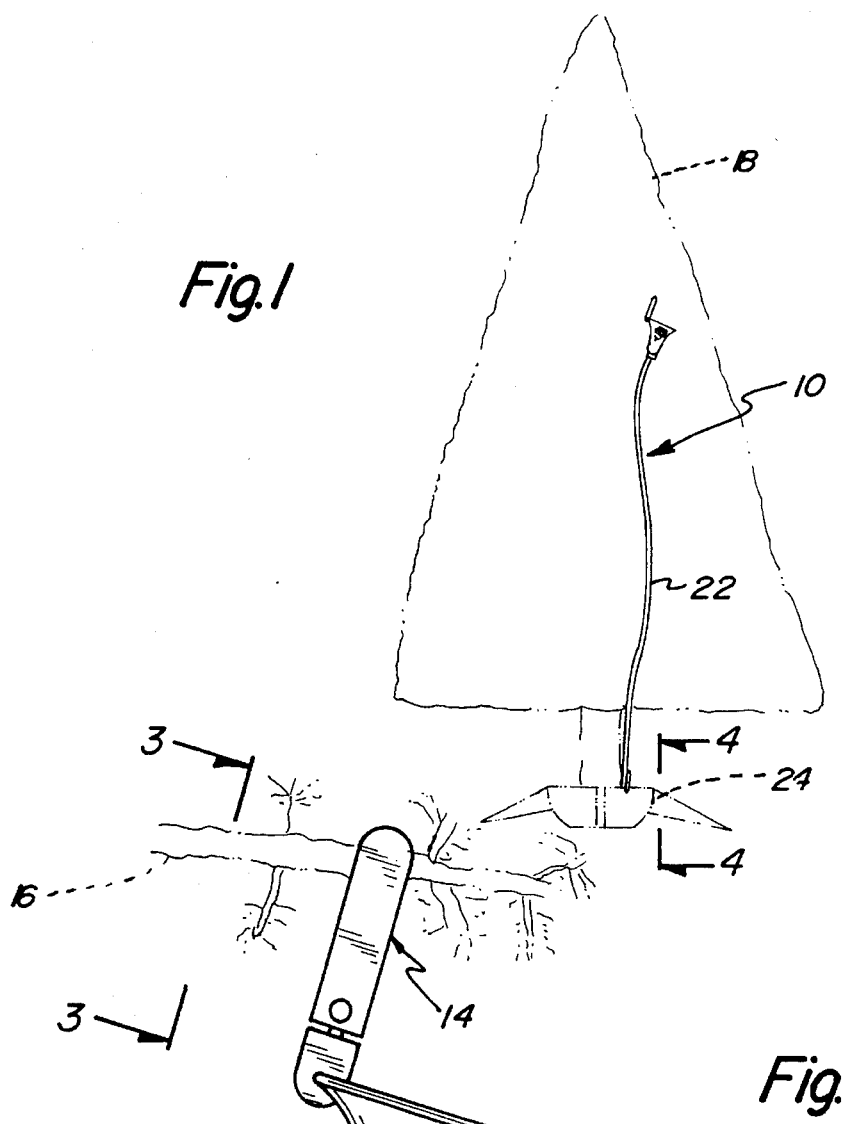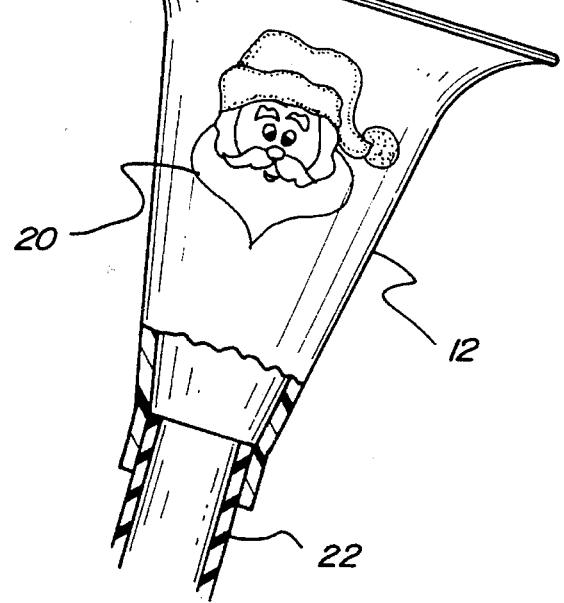

5,473,838

CHRISTMAS TREE WATERING DEVICE

BACKGROUND OF THE INVENTION

1. Field of the Invention

The present invention relates to irrigation structures and more particularly pertains to a Christmas tree watering device for conveying irrigation water to a Christmas tree stand fluid bowl.

2. Description of the Prior Art

The use of irrigation structures is known in the prior art. More specifically, irrigation structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art irrigation structures include U.S. Pat. No. 4,653,224; U.S. Pat. No. 4,825,587; U.S. Pat. No. 4,993,176; U.S. Pat. No. 5,076,009; and U.S. Pat. No. 5,201,140.

While these devices fulfill their respective, particular objectives and requirements, the aforementioned patents do not disclose a Christmas tree watering device for conveying irrigation water to a Christmas tree stand fluid bowl which includes a funnel securable to a branch of the tree, and a tubular conduit extending from the funnel along the tree trunk, thereby permitting fluid to be added to the tree stand without requiring an individual to directly access the fluid bowl.

In these respects, the Christmas tree watering device according to the present invention substantially departs from the conventional concepts and designs of the prior art, and in so doing provides an apparatus primarily developed for the purpose of conveying irrigation water to a Christmas tree stand fluid bowl.

SUMMARY OF THE INVENTION

In view of the foregoing disadvantages inherent in the known types of irrigation structures now present in the prior art, the present invention provides a new Christmas tree watering device construction wherein the same can be utilized for conveying irrigation water to a Christmas tree stand fluid bowl. As such, the general purpose of the present invention, which will be described subsequently in greater detail, is to provide a new Christmas tree watering device apparatus and method which has many of the advantages of the irrigation structures mentioned heretofore and many novel features that result in a Christmas tree watering device which is anticipated, rendered obvious, suggested, or even implied by any of the prior art irrigation structures, either alone or in any combination thereof.

To attain this, the present invention generally comprises a device for providing irrigation water to a Christmas tree stand fluid bowl. The inventive device includes a funnel securable to a branch of the tree. A tubular conduit extends from the funnel along the tree trunk and terminates within the fluid bowl, thereby permitting fluid to be added to the fluid bowl without requiring an individual to directly access the fluid bowl.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Christmas tree watering device apparatus and method which has many of the advantages of the irrigation structures mentioned heretofore and many novel features that result in a Christmas tree watering device which is not anticipated, rendered obvious, suggested, or even implied by any of the prior art irrigation structures, either alone or in any combination thereof.

It is another object of the present invention to provide a new Christmas tree watering device which may be easily and efficiently manufactured and marketed.

It is a further object of the present invention to provide a new Christmas tree watering device which is of a durable and reliable construction.

An even further object of the present invention is to provide a new Christmas tree watering device which is susceptible of a low cost of manufacture with regard to both materials and labor, and which accordingly is then susceptible of low prices of sale to the consuming public, thereby making such Christmas tree watering devices economically available to the buying public.

Still yet another object of the present invention is to provide a new Christmas tree watering device which provides in the apparatuses and methods of the prior art some of the advantages thereof, while simultaneously overcoming some of the disadvantages normally associated therewith.

Still another object of the present invention is to provide a new Christmas tree watering device for conveying irrigation water to a Christmas tree stand fluid bowl.

Yet another object of the present invention is to provide a new Christmas tree watering device which includes a funnel securable to a branch of the tree, and a tubular conduit extending from the funnel along the tree trunk, thereby permitting fluid to be added to the tree stand without requiring an individual to directly access the fluid bowl.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevation view of a Christmas tree watering device according to the present invention as installed within a Christmas tree.

FIG. 2 is an enlarged front elevation view of the invention.

DESCRIPTION OF THE PREFERRED EMBODIMENT

Figure 3:
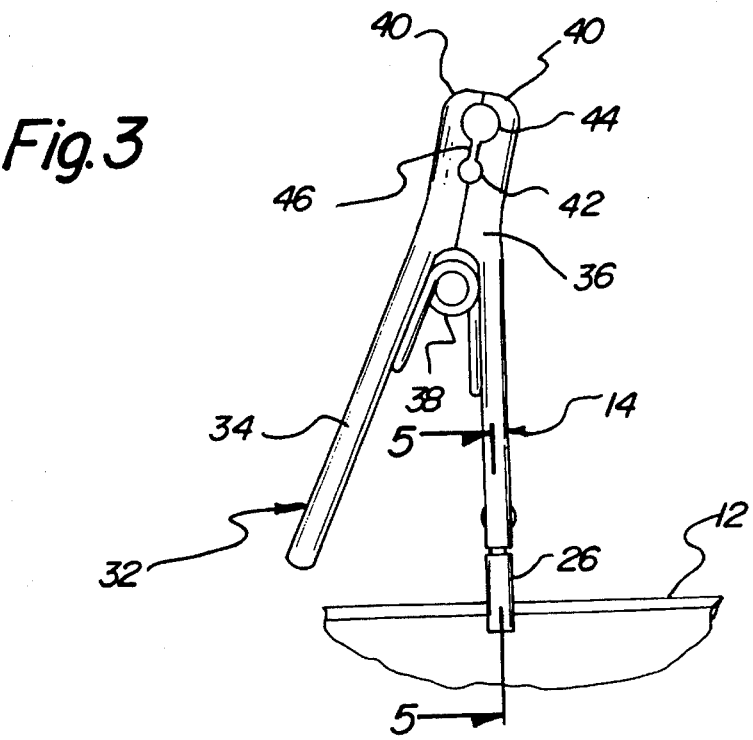
FIG. 3 is a side elevation view of a portion of the invention as seen from line 3—3 of FIG. 2.

With reference now to the drawings, and in particular to FIGS. 1–6 thereof, a new Christmas tree watering device embodying the principles and concepts of the present invention and generally designated by the reference numeral 10 will be described.

More specifically, it will be noted that the Christmas tree watering device 10 comprises a funnel 12 equipped with a funnel mounting means 14 for securing an edge of the funnel to a tree branch 16 of a Christmas tree 18, as best illustrated in FIGS. 1 and 2. The funnel 12 is preferably shaped as inverted bell and may include indicia 20 thereon for disguising the device 10 amongst a plurality of tree ornaments commonly positioned upon the Christmas tree 18. The funnel 12 is in fluid communication with a tubular conduit 22 such that fluids poured into the funnel 12 will be directed into the tubular conduit. The tubular conduit 22 extends along the trunk of the Christmas tree 18 and terminates within an unlabeled fluid bowl of a tree stand 24 within which the tree 18 is mounted. By this structure, irrigation fluids such as water or the like can be easily conveyed to the fluid bowl of the tree stand 24 without requiring an individual to directly access the fluid bowl through stooping, bending over, or other stressful physical activities.

Figure 5:
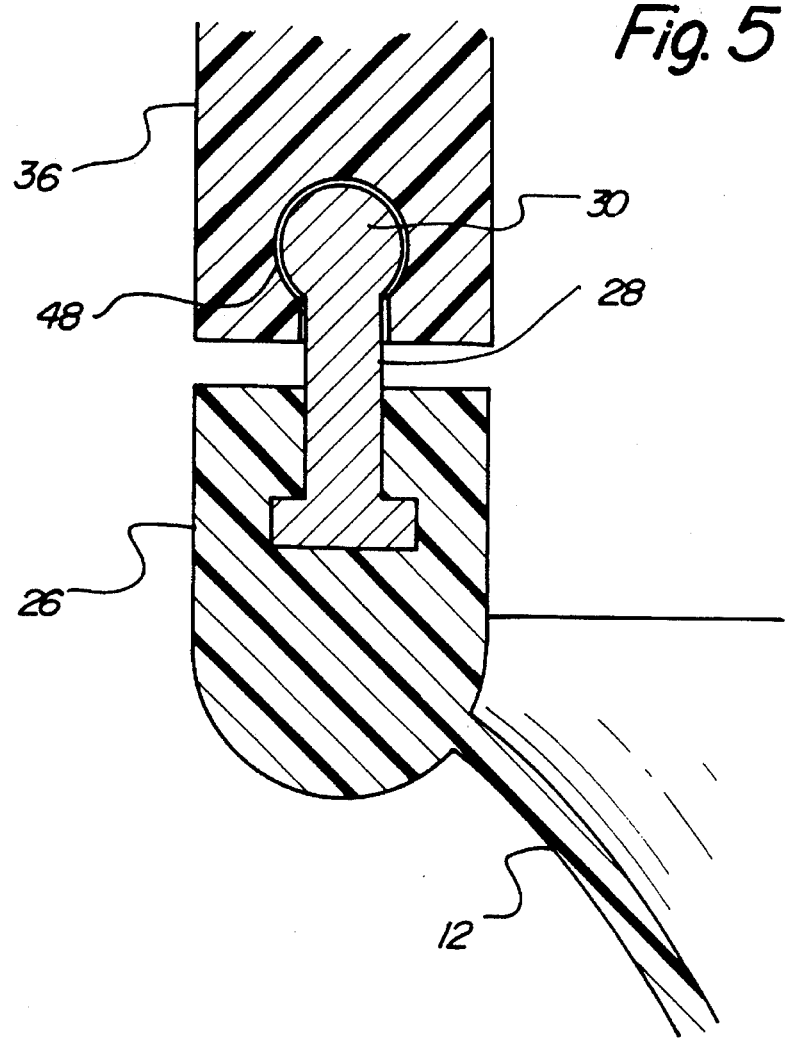
FIG. 5 is a cross section illustration taken along line 5—5 of FIG. 3.

The funnel mounting means 14 is illustrated in detail in FIGS. 3 and 5, and it can be shown from these figures that a funnel mount 26 is integrally or otherwise fixedly secured to a circumferential edge of the funnel 12. A projection 28 extends from the funnel mount 26 and terminates at an upper distal end thereof in a mounting sphere 30. The mounting sphere 30 is rotatably coupled to a branch engaging clip 32. The branch engaging clip 32 comprises a first clip arm 34 pivotally mounted to a second clip arm 36 by a torsion spring 38 coupled therebetween. The first and second clip arms 34, 36 include abutting jaw portions 40 which cooperate to capture a portion of the tree branch 16 therebetween. The jaw portions 40, when positioned together as shown in FIG. 3, cooperate to define a first circular aperture 42 spaced from a second circular aperture 44, with a rectangular aperture 46 extending between the first and second circular apertures. Preferably, the first circular aperture 42 has a first diameter and the second circular aperture 44 has a second diameter, wherein the first diameter of the first circular aperture is substantially less than the second diameter of the second circular aperture. Because the first and second circular apertures 42, 44 have different diameters, a variety of tree branches 16 can be accommodated. Further, the rectangular aperture 46 extending between the first and second circular apertures 42, 44 permits the branch engaging clip 32 to be attached to flat surfaces as well.

Referring back now to FIG. 5, the mounting sphere 30 of the projection 28 secured to the funnel mount 26 is rotatably received within a clip arm cavity 48 formed in the second clip arm 36. By this structure, the branch engaging clip 32 of the funnel mounting means 14 is permitted to rotate relative to the funnel 12 during an installation of the device 10 onto a tree branch 16 as described above.

Figure 4:
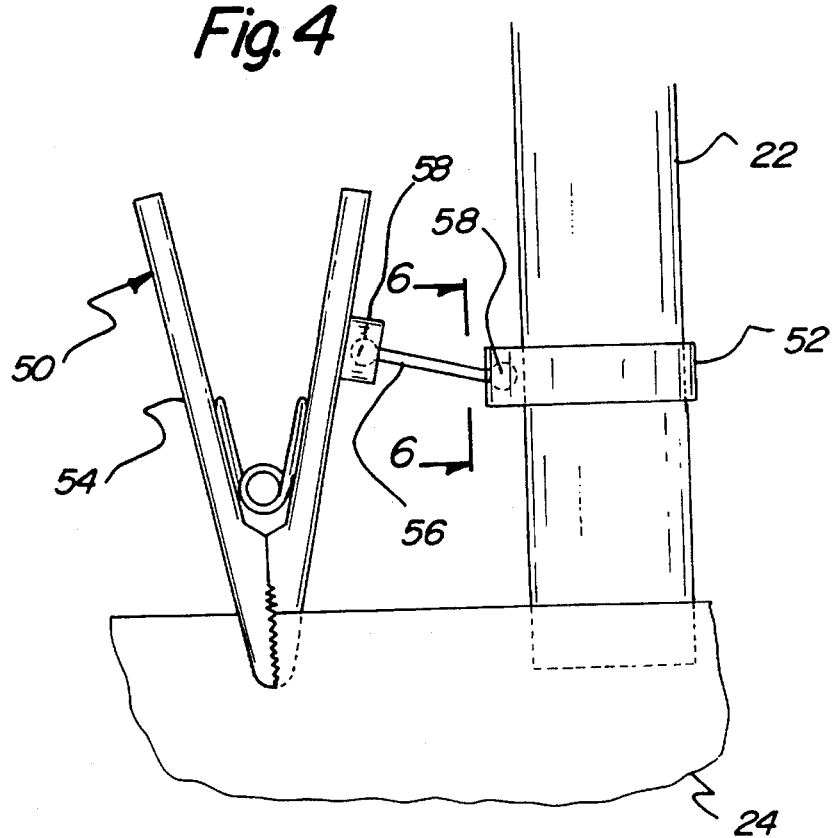
FIG. 4 is an enlarged side elevation view of a portion of the present invention taken from line 4—4 of FIG. 1.
Figure 6:
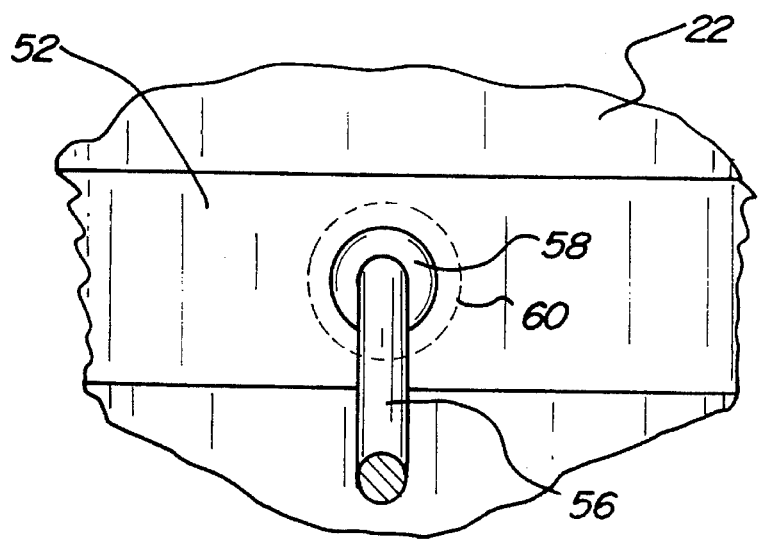
FIG. 6 is a further cross section illustration taken along line 6—6 of FIG. 4.

As best illustrated in FIGS. 4 and 6, it can be shown that the lower distal end of the tubular conduit 22 is advantageously coupled to the unlabeled fluid bowl of the tree stand 24 by a conduit mounting means 50 selectively engagable thereto. To this end, the conduit mounting means 50 comprises a mounting band 52 extending about the lower distal end of the tubular conduit 22 and coupled to a tree stand clamp 54 by a link 56. As shown in FIG. 6, the link 56 is provided with first and second ends, with first and second link spheres 58 extending from the first and second ends of the link, respectively. The first link sphere 58 is received within a mounting band cavity 60 formed in the mounting band 52, and the second link sphere 58 is received within an unlabeled tree stand clamp cavity formed within the tree stand clamp 54. By this structure, the tree stand clamp 54 is free to rotate relative to the mounting band 52, thereby allowing the tree stand clamp to be positioned in a variety of orientations relative to the lower distal end of the tubular conduit 22. As such, the tubular conduit 22 can be positioned and retained at any desired orientation within the fluid bowl of the tree stand 24.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Christmas tree watering device comprising:

a funnel;

a funnel mounting means for securing an edge of said funnel to a tree branch;

a tubular conduit in fluid communication with said funnel such that fluids poured into said funnel will be directed into said tubular conduit;

a conduit mounting means for coupling a lower distal end of said tubular conduit to a fluid bowl of a tree stand;

wherein said funnel mounting means comprises a branch engaging clip coupled to said funnel;

wherein said funnel mounting means further comprises a funnel mount secured to a circumferential edge of the funnel; a protection extending from said funnel mount and terminating at an upper distal end thereof in a mounting sphere, said mounting sphere being rotatably coupled to said branch engaging clip;

wherein said branch engaging clip comprises a first clip arm pivotally mounted to a second clip arm by a torsion spring coupled therebetween, said first and second clip arms including abutting jaw portions which cooperate to capture a portion of said tree branch therebetween, said jaw portions cooperating to define a first circular aperture spaced from a second circular aperture, with a rectangular aperture extending between said first and second circular apertures.

2. The Christmas tree watering device of claim 1, wherein said first circular aperture has a first diameter and said second circular aperture has a second diameter, wherein said first diameter of said first circular aperture is substantially less than said second diameter of said second circular aperture.

3. The Christmas tree watering device of claim 2, wherein said mounting sphere of said projection is rotatably received within a clip arm cavity formed in said second clip arm to rotatably couple said branch engaging clip to said funnel.

4. The Christmas tree watering device of claim 3, wherein said conduit mounting means comprises a mounting band extending about said lower distal end of said tubular conduit; and a tree stand clamp movably coupled to said mounting band.

5. The Christmas tree watering device of claim 4, wherein said tree stand clamp is movably coupled to said mounting band by a link, said link having first and second ends, with first and second link spheres extending from said first and second ends of said link, respectively, said first link sphere being received within a mounting band cavity formed in said mounting band, and said second link sphere being received within a tree stand clamp cavity formed within said tree stand clamp.

6. A Christmas tree watering device comprising:

a funnel, said funnel being shaped as an inverted bell and including indicia thereon for disguising said funnel amongst a plurality of tree ornaments positioned within a Christmas tree;

a funnel mounting means for securing an edge of said funnel to a tree branch, said funnel mounting means comprising a branch engaging clip coupled to said funnel; a funnel mount secured to a circumferential edge of the funnel; a projection extending from said funnel mount and terminating at an upper distal end thereof in a mounting sphere, said mounting sphere being rotatably coupled to said branch engaging clip, said branch engaging clip comprising a first clip arm pivotally mounted to a second clip arm by a torsion spring coupled therebetween, said first and second clip arms including abutting jaw portions which cooperate to capture a portion of said tree branch therebetween, said jaw portions cooperating to define a first circular aperture spaced from a second circular aperture, with a rectangular aperture extending between said first and second circular apertures, said first circular aperture having a first diameter and said second circular aperture having a second diameter, wherein said first diameter of said first circular aperture is substantially less than said second diameter of said second circular aperture, said mounting sphere of said projection being rotatably received within a clip arm cavity formed in said second clip arm to rotatably couple said branch engaging clip to said funnel;

a tubular conduit in fluid communication with said funnel such that fluids poured into said funnel will be directed into said tubular conduit; and, a conduit mounting means for coupling a lower distal end of said tubular conduit to a fluid bowl of a tree stand, said conduit mounting means comprising a mounting band extending about said lower distal end of said tubular conduit; a tree stand clamp movably coupled to said mounting band; and a link having first and second ends, with first and second link spheres extending from said first and second ends of said link, respectively, said tree stand clamp being movably coupled to said mounting band by said link wherein said first link sphere is received within a mounting band cavity formed in said mounting band, and said second link sphere is received within a tree stand clamp cavity formed within said tree stand clamp.

7. A Christmas tree watering device comprising:

a funnel;

a funnel mounting means for securing an edge of said funnel to a tree branch;

a tubular conduit in fluid communication with said funnel such that fluids poured into said funnel will be directed into said tubular conduit;

a conduit mounting means for coupling a lower distal end of said tubular conduit to a fluid bowl of a tree stand;

wherein said funnel mounting means comprises a branch engaging clip coupled to said funnel, the branch engaging clip comprising a first clip arm pivotally mounted to a second clip arm by a torsion spring coupled therebetween, said first and second clip arms including abutting jaw portions which cooperate to capture a portion of said tree branch therebetween, said jaw portions cooperating to define a first circular aperture spaced from a second circular aperture, with a rectangular aperture extending between said first and second circular apertures, wherein said first circular aperture has a first diameter and said second circular aperture has a second diameter, wherein said first diameter of said first circular aperture is substantially less than said second diameter of said second circular aperture;

wherein said conduit mounting means comprises a mounting band extending about said lower distal end of said tubular conduit; and a tree stand clamp movably coupled to said mounting band; and wherein said tree stand clamp is movably coupled to said mounting band by a link, said link having first and second ends, with first and second link spheres extending from said first and second ends of said link, respectively, said first link sphere being received within a mounting band cavity formed in said mounting band, and said second link sphere being received within a tree stand clamp cavity formed within said tree stand clamp.

* * * * *